(12) United States Patent
Crochemore et al.

(10) Patent No.: US 12,345,166 B2
(45) Date of Patent: Jul. 1, 2025

(54) DEVICE FOR CONNECTING PARTS OF AN AIRCRAFT ENGINE AND METHOD FOR USING SAME

(71) Applicant: SAFRAN AIRCRAFT ENGINES, Paris (FR)

(72) Inventors: Yves Roland Crochemore, Moissy-Cramayel (FR); Almeric Pierre Louis Garnier, Moissy-Cramayel (FR); Tony Alain Roger Joel Lhommeau, Moissy-Cramayel (FR); Franck Serge Jacques Liotte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 578 days.

(21) Appl. No.: 17/755,361

(22) PCT Filed: Nov. 2, 2020

(86) PCT No.: PCT/FR2020/051975
§ 371 (c)(1),
(2) Date: Apr. 27, 2022

(87) PCT Pub. No.: WO2021/089933
PCT Pub. Date: May 14, 2021

(65) Prior Publication Data
US 2022/0372889 A1 Nov. 24, 2022

(30) Foreign Application Priority Data
Nov. 7, 2019 (FR) ........................................ 1912524

(51) Int. Cl.
*F01D 17/02* (2006.01)
*B64D 43/00* (2006.01)
*B64D 45/00* (2006.01)

(52) U.S. Cl.
CPC ............. *F01D 17/02* (2013.01); *B64D 43/00* (2013.01); *B64D 2045/0085* (2013.01)

(58) Field of Classification Search
CPC ...................................................... B64D 43/00
See application file for complete search history.

(56) References Cited

U.S. PATENT DOCUMENTS

2020/0103445 A1\* 4/2020 Medina Garcia ...... G01R 31/58
2020/0351168 A1\* 11/2020 Hirano .................. H04L 67/131

FOREIGN PATENT DOCUMENTS

| EP | 1512901 A2 | 3/2005 |
| EP | 2003384 A1 | 12/2008 |

(Continued)

OTHER PUBLICATIONS

International Search Report received for PCT Patent Application No. PCT/FR2020/051975, mailed on Dec. 22, 2020, 5 pages (2 pages of English Translation and 3 pages of Original Document).

*Primary Examiner* — Imran K Mustafa
(74) *Attorney, Agent, or Firm* — WOMBLE BOND DICKINSON (US) LLP

(57) ABSTRACT

The invention relates to a device for connecting parts of an aircraft engine. The connection device comprises connectors suitable for connecting a first and a second part so as to establish a physical transfer link between these parts and means which enable it to monitor the state of the connection in particular by means of an impedance measurement carried out in a circuit formed by components integrated into said connectors.

11 Claims, 3 Drawing Sheets

(56) References Cited

FOREIGN PATENT DOCUMENTS

EP         2739842  A1   6/2014
WO    2013/021120  A1   2/2013

\* cited by examiner

DEVICE FOR CONNECTING PARTS OF AN AIRCRAFT ENGINE AND METHOD FOR USING SAME

TECHNICAL FIELD OF THE INVENTION

The invention relates to the field of assembly of aircraft engine parts. It relates in particular to a device for connecting parts of an aircraft engine. The invention also relates to a method of using said connection device.

TECHNICAL BACKGROUND

The prior art comprises, in particular, the documents EP-A1-2003 384, EP-A1-2 739 842 and EP-A2-1 512 901.

Recent projections call for a doubling of the aircraft population in the coming decades. These projections are themselves based on forecasts of increased passenger traffic leading to a doubling of the number of passengers by 2030 and necessarily implying a strong growth in the number of aircraft in circulation.

To meet this growth, the production and maintenance of aircrafts must also increase significantly. The same is true for the engines of these aircrafts.

One of the solutions being considered to meet this problem in increase in production rate is the use of "fast" coupling systems for parts. The objective is to gain in simplicity and operating time on the assembly lines. In particular, such a solution consists of replacing parts that are usually bolted, screwed or welded together with more modular connection devices that allow for rapid attachment.

Advantageously, the rapid connection devices allow the monitoring of the tightening torque inherent in the parts screwed together to be dispensed with. In fact, in an aircraft, screwed connections imply checking that the safety constraints on the attachment are respected by measuring the tightening torque, for example with a torque wrench.

The known quick coupling methods use, for example, bayonet-type connectors or push-pull connectors for which no torque monitoring is required. In addition, these systems are said to be fast in that they allow parts to be assembled or disassembled more quickly and thus shorten the duration of assembly/disassembly operations compared to conventional attachment.

These coupling systems are used, for example, in the field of motor sports where they allow the connection of fluid pipes (e.g. air, fuel or oil) and electrical cables.

In addition, they also provide additional security during assembly/disassembly operations. Indeed, a malicious act consisting in unscrewing a screwed connection is rarely perceptible to the eye. On the other hand, on a quick coupling system, a malicious manipulation of a connector is more easily perceptible to the eye. The use of such a system therefore reduces the risk of IFSD (In Flight Shut Down) events occurring due to a defective connection.

However, even with a quick coupling system, it can be very time-consuming during assembly and/or maintenance operations to verify that two parts are connected according to a nominal connection, i.e., as intended by the manufacturer of the connection device.

Furthermore, a non-nominal connection is all the more likely to occur as it can be the result of an incorrect assembly or maintenance operation as well as a malicious act.

It is already known to monitor the torque of screwed fittings. Such an approach relies on the dynamic measurement of this torque and the comparison of the gradient of the evolution of this torque with predetermined values to identify whether a coupling is sufficient or not. However, this approach requires complex measurements and is not applicable to fast connections.

The patent application EP 2739842 A1 describes a method for monitoring locking means. In this case, the monitoring applies to electrical actuator type locking means and thus does not concern a connection between parts for a physical transfer link.

SUMMARY OF THE INVENTION

The present invention provides a connection device for monitoring in real time the state of the connection between the connectors included in a connection device and thus between the parts it connects. In other words, the connection device incorporates means that allow it to self-diagnose. In addition, in some embodiments, the connection device can also analyze the time evolution of the state of the connection and allow better management or even anticipation of a malfunction linked to a defective connection.

To this end, according to a first aspect, the invention relates to a device for connecting parts of an aircraft engine, said device comprising a first and a second connector suitable for connecting a first and a second parts so as to establish a physical transfer link between said first and second parts, said connection device being characterized in that it further comprises:

emitting means, adapted to generate a determined physical signal;

first transmission means, adapted to transmit the determined physical signal between at least first, second and third determined components of the first and second connectors;

the first component, included in the first connector, having a first determined impedance, relative to said physical signal;

said at least a second and a third components, included in the second connector, having respectively a second and a third determined impedance, relative to said physical signal, said second impedance being different from said third impedance;

at least one first connecting element, included in the first connector, associated with the first component, and adapted to establish a connection link with at least one second and one third connecting element, included in the second connector, and respectively associated with the second and third components;

detection means, adapted to measure at least one characteristic representative of the determined physical signal circulating in the first, second and third components;

second transmission means, adapted to transmit measurement data from the detection means to first processing means;

the first processing means, adapted to receive measurement data from the detection means and generate information representative of a connection state between the first and second parts of the aircraft engine based on said measurement data; and display means, adapted to display the information representative of a connection state between the first and second parts of the aircraft engine.

The device according to the invention may include one or more of the following features, taken alone or in combination with each other:

a physical transfer link is a transfer link of a fluid, or a transfer link of an electrical signal, or a transfer link of an optical signal;

the determined physical signal is an electrical signal or an optical signal;

the characteristic representative of a determined physical signal is included among, the impedance, the intensity of said physical signal or the amplitude of said physical signal;

the first, second and third connecting elements of the connectors are arranged on separate portions of said connectors so that the establishment of a connection link between two connecting elements depends on the respective position of said connectors;

an information representative of a connection state between the first and second parts is included among the following information:

the absence of connection, corresponding to the absence of connection link established between the first and second or third connecting elements of the connectors;

the lack of connection, corresponding to a connection link established between the first connecting element of the first connector and the second connecting element of the second connector; and the nominal connection, corresponding to a connection link established between the first connecting element of the first connector and the third connecting element of the second connector;

the display means are comprised in a connector, or comprised in the aircraft engine, or comprised in an equipment offloaded from the aircraft engine;

the device further comprises:

second processing means, adapted to process information representative of a connection state between the first and second parts of the aircraft engine acquired successively so as to determine a time evolution of a connection state between the first and second parts of the aircraft engine; and, a memory, adapted to store information representative of a connection state between the parts of an aircraft engine;

The invention also relates, according to a second aspect, to a method of use of a connection device according to the first aspect, said method comprising the steps of:

emitting at least one physical signal;

transmitting the physical signal between the emitting means, the first component of the first connector and, when a connection link is established, a component of the second connector connected to the first component by the first and second or third connecting elements; and measuring at least one characteristic representative of the transmitted physical signal;

generating, from the measurement data, information representative of a connection state between the first and second parts of the aircraft engine; and, displaying the information representative of a connection state between the first and second parts of the aircraft engine;

The method according to the invention may further comprise the following steps:

processing the information representative of a connection state between the first and second parts of the aircraft engine acquired successively so as to determine a time evolution of the connection state between the first and second parts of the aircraft engine; and, storing, in a memory, information representatives of a connection state between the first and second parts of the aircraft engine.

BRIEF DESCRIPTION OF THE FIGURES

The present invention will be better understood and further details, features and advantages of the present invention will become clearer upon reading the following non-limiting example description, with reference to the attached drawings in which.

The elements having the same functions in the different embodiments have the same references in the figures.

DETAILED DESCRIPTION OF THE INVENTION

Figure 1:
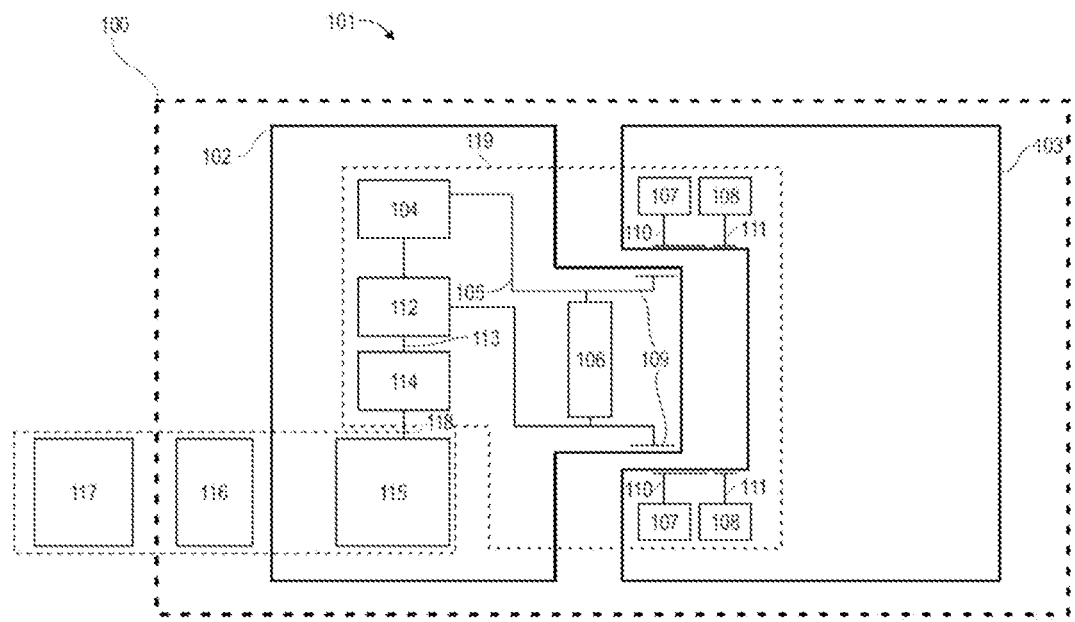
FIG. 1 is a schematic representation of an embodiment of a connection device according to the invention.
Figure 2:
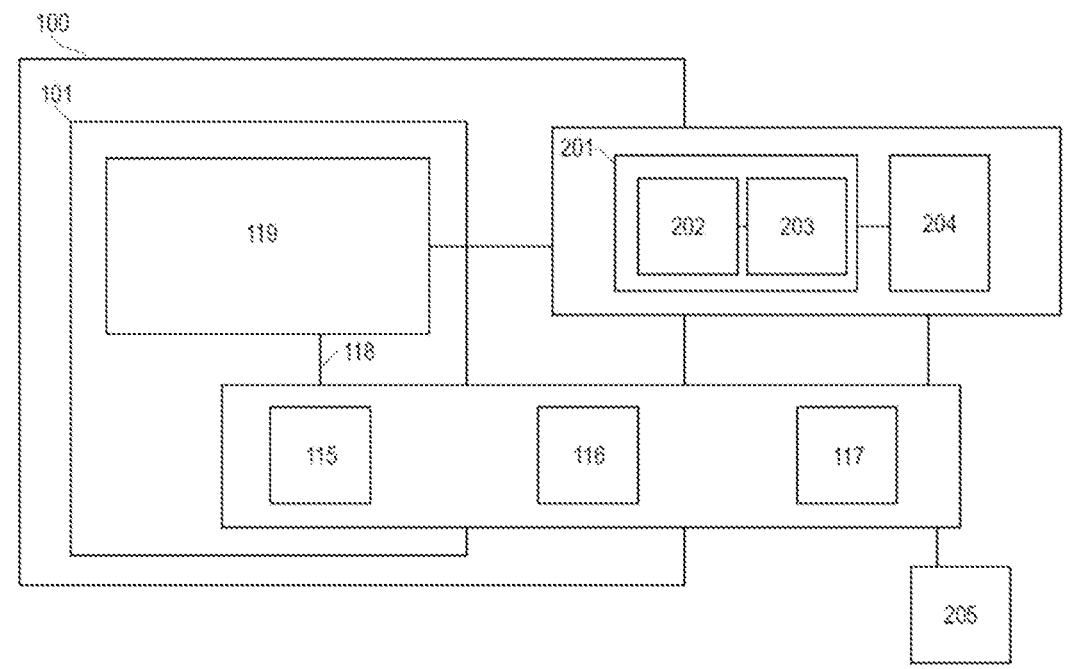
FIG. 2 is a schematic representation of another embodiment of a connection device according to the invention.
Figure 3:
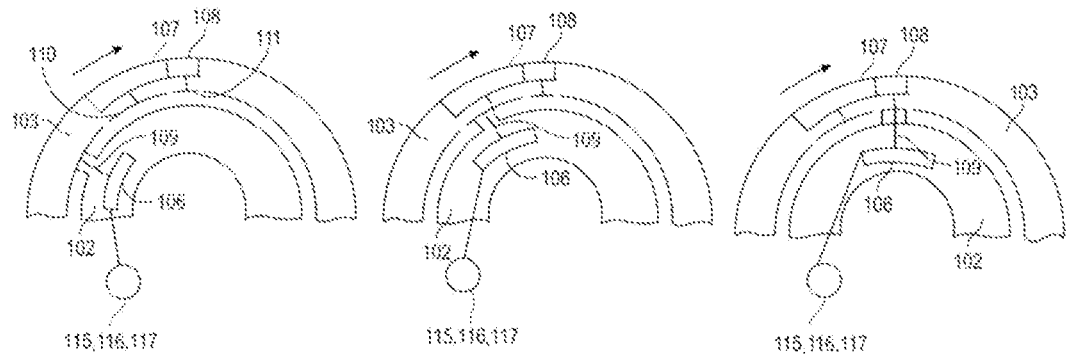
FIG. 3 is a schematic representation of yet another embodiment of a connection device according to the invention.

With reference to FIG. 1, FIG. 2 and FIG. 3, embodiments of a connection device according to the invention will now be described.

The connection device 101 is used to connect two parts (not shown in the figures) of an aircraft engine 100. In particular, the device 101 comprises a first connector 102 and a second connector 103 adapted to connect the first part and the second part so as to establish a physical transfer link between these two parts. For example, the connectors are respectively attached to a pipe, an electrical cable or an optical fiber. Thus, by physical transfer link we mean, for example, a link for transferring a fluid, a link for transferring an electrical signal or a link for transferring an optical signal.

Furthermore, the two connectors can be one of the male type and the other of the female type or both of the same type insofar as they allow a connection to be established which allows a physical transfer link to be established. In addition, the connectors are preferably threadless. In other words, the connection device is a so-called quick connection device for which the connectors are, for example, bayonet-type or push-pull type connectors.

In particular, the connection device according to the invention allows self-diagnosis of the state of the connection it provides. This capability is based on a set of means included in the connection device.

The emitting means 104 are adapted to generate a determined physical signal. Such a physical signal may be, for example, an electrical signal or an optical signal. The transmission means 105 are adapted to transmit the signal in question between components of the connectors 102 and 103.

More specifically, the first component 106, included in the first connector 102, has a first determined impedance $Z106$, relative to said physical signal. The expression "relative to said physical signal" refers to the fact that the impedance may be electrical or optical depending on whether the signal emitted by the emitting means 104 is an electrical or optical signal.

The second component 107 and the third component 108, included in the second connector 103, have respectively a second impedance $Z107$ and a third impedance $Z108$, relative to said physical signal. The second impedance $Z107$ is different from the third impedance $Z108$.

Thus, in the illustrated example, the physical signal emitted by the emitting means 104 circulates, via the transmission means 105, between the different components (i.e., the components 106, 107 and 108). Furthermore, the person skilled in the art will appreciate that the number of components included in the connectors, and in particular in the second one, may be greater than two.

The first connecting element 109, included in the first connector 102, is associated with the first component, and adapted to establish a connection link with the second connecting element 110 and the third connecting element 111 which are themselves respectively associated with the second and third component. In other words, the first connecting element can establish a connection link with the second connecting element 110, with the third connecting element 111, or with neither of these connecting elements. In this way, the emitted physical signal flows only through the first component, through the first and second components, or through the first and third components depending on which connecting elements are actually connected.

Furthermore, the first, second and third connecting elements of the connectors may be arranged on separate portions of the connectors such that the establishment of a connection link between two connecting elements depends on the respective position of said connectors. In other words, the signal flows in a different electrical circuit (i.e., with different properties) depending on whether the connectors are more or less well connected. Thus, in the example shown in FIG. 1, the establishment of a connection link between the connecting elements 109, 110 and 111 depends on the insertion of the first connector 102 into the second connector 103. Such a case may correspond, for example, to the use of "push-pull" type connectors.

In another example, shown in FIG. 3, the connectors 102 and 103 have circular cross-sections and the respective connecting elements of the two connectors 102 and 103 are arranged on separate radial portions of these connectors. In this manner, whether or not a connection link is made depends on the relative angular position of each connector. Such a case may correspond, for example, to the use of bayonet-type connectors.

The detection means 112 are adapted to measure at least one characteristic representative of the determined physical signal flowing through the first, second and third components. For example, the characteristic representative of the physical signal may be the impedance, the strength of the physical signal, or the amplitude of the physical signal. In particular, this characteristic changes according to the connection links established or not between the different connecting elements and thus according to the components in which the signal flows. In this way, this characteristic can be used to determine the state of the connection between the two connectors and thus between the two parts of the motor.

The transmission means 113 are adapted to transmit measurement data from the detection means to the processing means 114, which in turn are adapted to receive such data and generate, based thereon, information representatives of a connection state between the first and second parts of the aircraft engine. In a particular embodiment, the information representatives of a connection state between the first and second parts may be:
 the absence of connection, which corresponds to the absence of established connection link between the first and second or third connecting elements of the connectors (as shown in FIG. 3, left);
 the lack of connection, which corresponds to a connection link established between the first connecting element of the first connector and the second connecting element of the second connector (as shown in FIG. 3, middle); and,
 the nominal connection, corresponding to a connection link established between the first connecting element of the first connector and the third connecting element of the second connector (as shown in FIG. 3, right).

In summary, the establishment of certain connection links modifies the properties of the circuit formed by the various connected components, which impacts the measurement performed by the detection means and is reflected in the information representatives generated by the processing means. For example, the addition of a new impedance, of a determined value, to the circuit in which the signal circulates, leads to a modification of the detected impedance which allows to decide on the precise state of the connection.

Finally, the display means 115, 116 and 117 are adapted to display information representatives of the state of the connection between the first and second parts of the aircraft engine. In the example shown in FIG. 1 and FIG. 2, the display means 115 are included in the connector 102, the display means 116 are included in the aircraft engine 100 (i.e., without being in the connector), and the display means 117 is included in an off-board equipment of the aircraft engine.

Thus, the display means 115 allow an operator to check the state of the connection directly on the connectors to be connected. The display means 115 can consist, for example, of a simple light-emitting diode (LED) located on the connector displaying the colour red, orange or green according to the state of the connection (i.e., respectively absence of connection, lack of connection or nominal connection).

The display means 116 allow an operator to check the state of the connection on a specific display of the turbomachine. Moreover, since these means are not integrated into any connector, they allow a more complete display, for example via the use of a screen or an LED box. In particular, such display means can show the connection state of several pairs of parts and thus summarize the state of all the connections in an aircraft engine. Such a display can then guide and take corrective actions on faulty connection links if needed. In such an embodiment, a concatenation module, integrated into the display means, centralizes the information from several processing units of different connection devices to enable them to display all of this information.

Finally, the display means 117 allow to check the state of a connection via consultation means external to the aircraft engine. This can be, for example, a smartphone, a tablet, a computer or an augmented reality device (such as, for example, glasses).

In particular, the embodiments associated with the display means 116 and 117 allow for a "test-triggered" approach to the connection device. That is, an approach for which the operations associated with diagnosing the state of the connection are only activated when an operator wishes to do so and not on a continuous basis.

Furthermore, in all the above-described embodiments, the information to be displayed is transited between all the equipment 119 and the display means by suitable transmission means 118 which may or may not be wired.

In summary, thanks to this device, the assembly operations are made safer by simplified verification of the correct locking of the connectors. The maintenance inspections of the connection link state or the verification of the correct reconnection of the connectors after a maintenance operation are also facilitated. In addition, the maintenance process is facilitated since it is no longer necessary to check all the connectors by conventional and time-consuming means, but only to operate on the connectors requiring it, i.e., the connectors whose connection is in a state other than nominal.

As for the embodiment of the connection device described with reference to FIG. 2, it is intended to allow, in addition to the monitoring of the state of the connection, the establishment of a prognosis allowing to anticipate the future evolution of the state of the connection.

In particular, the processing means 201 are adapted to process information representatives of a connection state between the first and second parts of the aircraft engine which are acquired successively. This successively acquired information are used to determine the time evolution of the state of the connection between the first and second parts of the aircraft engine. For example, in a particular embodiment, the processing means 201, comprise an algorithmic processing module 202 configured to determine a trend in the evolution of the state of the connection ("trend monitoring") and a reporting module 203 configured to determine a prediction of the future evolution from the determined trend.

In addition, the memory 204 is adapted to store the information representatives of a connection state between the parts of an aircraft engine that are acquired in succession.

Typically, in such an embodiment, a connector may comprise a number of components with different impedances greater than two. In this way, the connection device allows to track, more accurately, the evolution of a nominal connection state to a non-nominal connection state over time and, consequently, to better predict the evolution of the state of the connection and a possible exit from the nominal state to a non-nominal state. In addition, this type of prediction not only allows to consider a corrective action of re-connecting a connector to restore the nominal state of the state of the connection, but it is also possible to interpret the acquired information from the point of view of the wear of a connector to optimize the conditions for its replacement.

Finally, in a particular embodiment, the connection device may include an alarm device 205 integrated with the cockpit of the aircraft to communicate to a user, based on information representatives of the state of connection, an alert.

Figure 4:
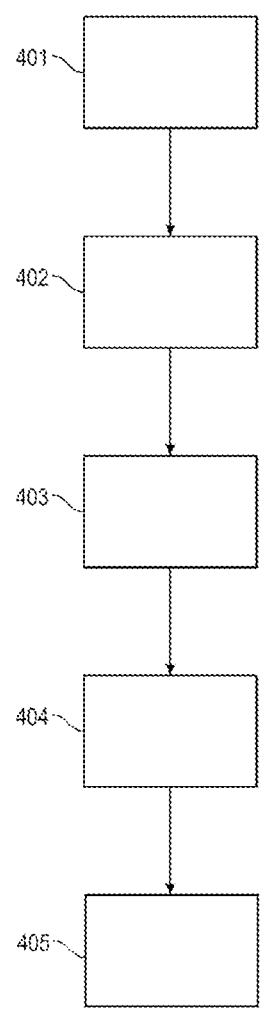
FIG. 4 is a step diagram of an embodiment of the method according to the invention; and, FIG. 5 is a step diagram of another embodiment of the process according to the invention.

With reference to FIG. 4, we will now describe a method of implementing the method of using a connection device according to the invention. The steps of the method are thus performed by a connection device as described with reference to FIGS. 1, 2 and 3.

The step 401 consists in the transmission of at least one physical signal which is then transmitted, in the step 402 between the emitting means, the first component of the first connector and, when a connection link is established, a component of the second connector connected to the first component by the first and second or third connecting elements.

The step 403 consists of measuring at least one characteristic representative of the transmitted physical signal, and the step 404 consists of generating information representatives of a connection state between the first and second parts of the aircraft engine from this measurement data.

Finally, the step 405 comprises displaying the information representatives of a connection state between the first and second parts of the aircraft engine.

Figure 5:
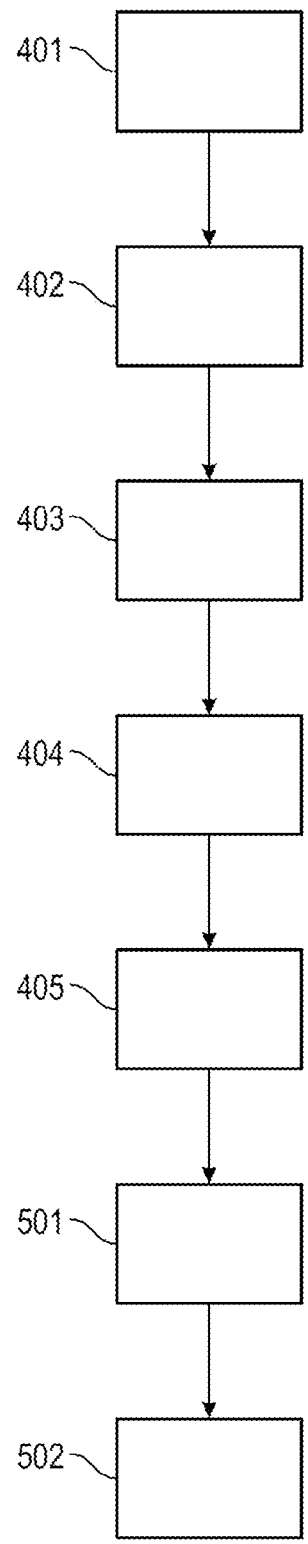

In another embodiment of the method, described with reference to FIG. 5, the method further comprises the step 501 of processing the information representatives of a connection state between the first and second parts of the aircraft engine acquired in succession so as to determine the time evolution of the state of the connection between the first and second parts of the aircraft engine and the step 502 of storing, in a memory, the information representatives of a connection state between the first and second parts of the aircraft engine.

The invention claimed is:

1. A device for connecting parts of an aircraft engine, said device comprising a first and a second connectors suitable for connecting a first and a second parts so as to establish a physical transfer link between said first and second parts, said connection device being characterized in that it further comprises:
   emitting means, adapted to generate a determined physical signal;
   first transmission means, adapted to transmit the determined physical signal between at least first, second and third determined components of the first and second connectors;
   the first component, included in the first connector, having a first determined impedance, relative to said physical signal;
   said at least a second and a third components, included in the second connector, having respectively a second and a third determined impedance, relative to said physical signal, said second impedance being different from said third impedance;
   at least one first connecting element, included in the first connector, associated with the first component, and adapted to establish a connection link with at least one second and one third connecting element, included in the second connector, and respectively associated with the second and third component;
   detection means, adapted to measure at least one characteristic representative of the determined physical signal circulating in the first, second and third components;
   second transmission means, adapted to transmit measurement data from the detection means to first processing means;
   first processing means, adapted to receive measurement data from the detection means and generate information representative of a connection state between the first and second parts of the aircraft engine based on said measurement data; and
   display means, adapted to display the information representative of a connection state between the first and second parts of the aircraft engine.

2. The connection device of claim 1, wherein a physical transfer link is a transfer link of a fluid, or a transfer link of an electrical signal, or a transfer link of an optical signal.

3. The connection device according to claim 1, wherein, the determined physical signal is an electrical signal or an optical signal.

4. The connection device according to claim 1, wherein the characteristic representative of a determined physical signal is included among, the impedance, the intensity of said physical signal or the amplitude of said physical signal.

5. The connection device according to claim 1, wherein the first, second and third connecting elements of the connectors are arranged on separate portions of said connectors such that the establishment of a connection link between two connecting elements depends on the respective position of said connectors.

6. The connection device according to claim 5, wherein an information representative of a connection state between the first and second parts is included of the following information:

the absence of connection, corresponding to the absence of connection link established between the first and second or third connecting elements of the connectors;

the lack of connection, corresponding to a connection link established between the first connecting element of the first connector and the second connecting element of the second connector; and the nominal connection, corresponding to a connection link established between the first connecting element of the first connector and the third connecting element of the second connector.

7. The connection device according to claim 1, wherein the display means are comprised in a connector, or included in the aircraft engine or comprised in an equipment off-loaded from the aircraft engine.

8. The connection device according to claim 1 further comprising:

second processing means, adapted to process information representative of a connection state between the first and second parts of the aircraft engine acquired successively so as to determine a time evolution of a connection state between the first and second parts of the aircraft engine; and, a memory, adapted to store information representative of a connection state between the parts of an aircraft engine.

9. A method of use of a connection device according to claim 1, said method comprising the steps of:

emitting at least one physical signal;

transmitting the physical signal between the emitting means, the first component of the first connector and, when a connection link is established, a component of the second connector connected to the first component by the first and second or third connecting elements;

measuring at least one characteristic representative of the transmitted physical signal;

generating, from the measurement data, information representative of a connection state between the first and second parts of the aircraft engine; and, displaying the information representative of a connection state between the first and second parts of the aircraft engine.

10. The method of use according to claim 9 further comprising the following steps:

processing the information representative of a connection state between the first and second parts of the aircraft engine acquired successively so as to determine a time evolution of the connection state between the first and second parts of the aircraft engine; and, storing, in a memory, information representatives of a connection state between the first and second parts of the aircraft engine.

11. A device for connecting parts of an aircraft engine, said device comprising a first and a second connectors suitable for connecting a first and a second parts so as to establish a physical transfer link between said first and second parts, said connection device further comprising:

emitting means, adapted to generate a determined physical signal;

first transmission means, adapted to transmit the determined physical signal between at least first, second and third determined components of the first and second connectors;

the first component, included in the first connector, having a first determined impedance, relative to said physical signal;

said at least a second and a third components, included in the second connector, having respectively a second and a third determined impedance, relative to said physical signal, said second impedance being different from said third impedance;

at least one first connecting element, included in the first connector, associated with the first component, and adapted to establish a connection link with at least one second and one third connecting element, included in the second connector, and respectively associated with the second and third component so that the physical signal flows only through the first component, through the first and second components, or through the first and third components depending which connecting elements are connected;

detection means, adapted to measure at least one characteristic representative of the determined physical signal circulating in the first, second and third components;

second transmission means, adapted to transmit measurement data from the detection means to first processing means;

first processing means, adapted to receive measurement data from the detection means and generate information representative of a connection state between the first and second parts of the aircraft engine based on said measurement data; and display means, adapted to display the information representative of a connection state between the first and second parts of the aircraft engine.

* * * * *